United States Patent
Kawahito (10) Patent No.: US 6,268,959 B1
(45) Date of Patent: Jul. 31, 2001

(54) INVERTED MICROSCOPE WITH OBJECTIVE LENS VIEW OPENING AND METHOD FOR USING SAME

(75) Inventor: Takashi Kawahito, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/637,914

(22) Filed: Aug. 14, 2000

(30) Foreign Application Priority Data

Aug. 26, 1999 (JP) .................................................. 11-239129

(51) Int. Cl.⁷ ............................ G02B 21/26; G02B 21/00
(52) U.S. Cl. ........................... 359/391; 359/368; 359/373
(58) Field of Search ................................... 359/368–374, 359/385, 900, 387–391, 394, 398

(56) References Cited

U.S. PATENT DOCUMENTS

| 4,210,384 | * | 7/1980 | Meyer et al. | 359/385 |
| 4,337,991 | * | 7/1982 | Benajam | 359/391 |
| 4,619,503 | * | 10/1986 | Reinheimer et al. | 359/385 |
| 6,184,973 | * | 2/2001 | Baer et al. | 356/36 |

FOREIGN PATENT DOCUMENTS 10-186239 * 7/1988 (JP) .

OTHER PUBLICATIONS

Patent Abstract of Japan, Inverted Microscope, Jul. 14, 1998, Uchida Tadashi, et al.

* cited by examiner

Primary Examiner—Thong Nguyen (57) ABSTRACT

An inverted microscope capable of confirming a marking or the like on an objective lens arranged under a stage from a normal viewpoint near an eyepiece without having to take a forced posture. The inverted microscope has a main body, a stage on the main body which holds a sample container, a nosepiece arranged under the stage, an objective lens fitted on the nosepiece, an eyepiece located diagonally above the stage, and an illumination system held over the stage by an illumination column. The stage has a confirmation opening, which is used for confirming conditions under the stage, and an observation opening, which is used to observe the sample. The confirmation opening is formed closer to the observer side of the optical axis of the objective lens than the observation opening, and is formed separately from the observation opening. The confirmation opening secures an optical path to view and observe the objective lens from a normal viewpoint near the eyepiece. Thus, a marking on the objective lens, as well as conditions around the objective lens can be confirmed from a normal viewpoint through the confirmation opening while a sample container is on the observation opening.

20 Claims, 8 Drawing Sheets

INVERTED MICROSCOPE WITH OBJECTIVE LENS VIEW OPENING AND METHOD FOR USING SAME

CROSS-REFERENCE TO RELATED APPLICATIONS

This application claims the benefit of Japanese Application No. 11-239129, filed Aug. 26, 1999, the disclosure of which is incorporated herein by reference.

BACKGROUND OF THE INVENTION

1. Field of the Invention

This invention relates to an inverted microscope for use in observing a specimen that allows the operator to confirm the settings of the microscope from a normal viewing position, and a method for using the same.

2. Description of Related Art

Figure 5:
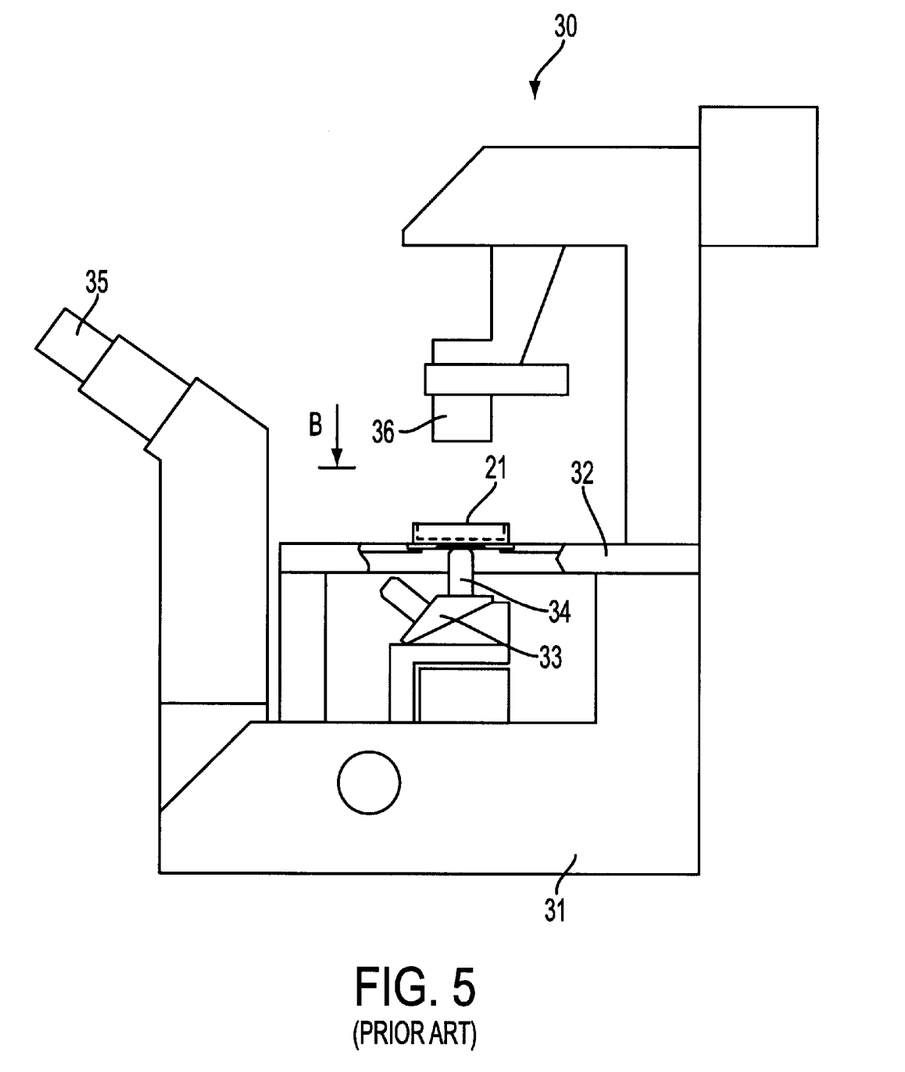
FIG. 5 is a side elevational view of a conventional inverted microscope.

As shown in FIG. 5, a conventional inverted microscope 30 has a main body 31, to which are attached a stage 32, a nosepiece 33 located below the stage 32, an objective lens 34 attached to the nosepiece 33, an eyepiece 35 located diagonally above the stage 32, and an illumination system 36 located over the stage 32. A sample container 21 for observation is placeable on the stage 32.

Figure 6:
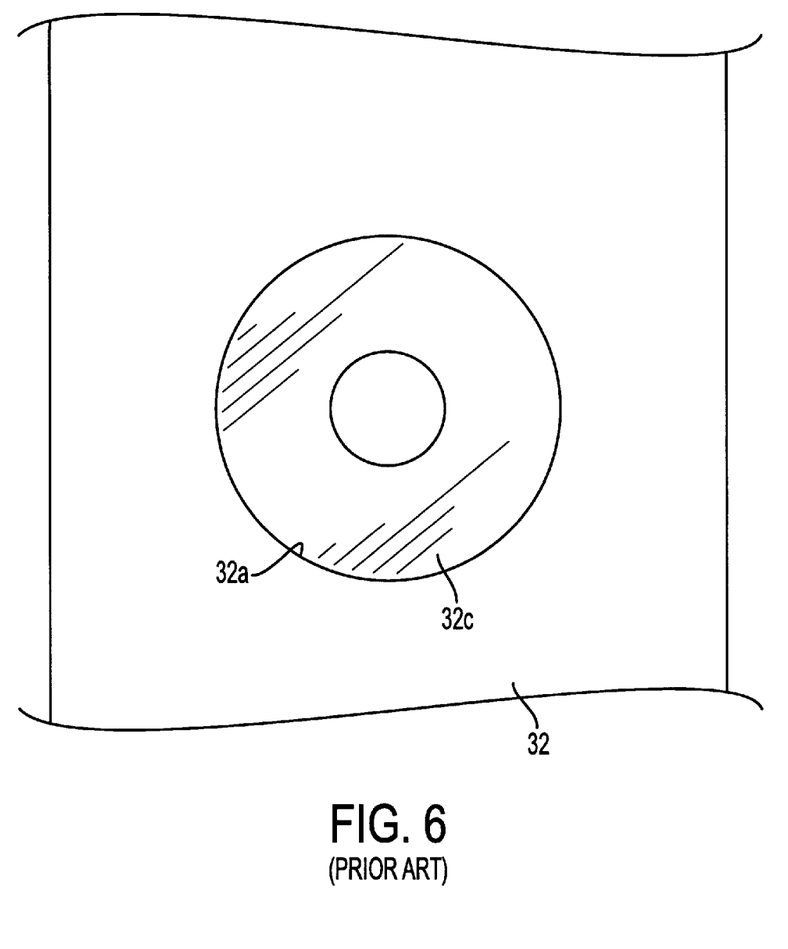
FIG. 6 is a top plan view of a stage of a conventional inverted microscope taken from a position as denoted by arrow B in FIG. 5.

As shown in FIG. 6 for this conventional inverted microscope 30, the stage 32 has an opening 32a, which is used to confirm the type of objective lens 34 being used under the stage 32, and to confirm adjustments made to the operating state of the objective lens 34 using a correction ring on the objective lens 34. The opening 32a is a hole having a diameter between 100 mm and 110 mm, and is larger around than the objective lens 34. A transparent annular disk 32c, which is made of a glass or a resin, is fitted into the opening 32a and allows an observer to view and confirm the conditions around the objective lens 34.

Figure 7:
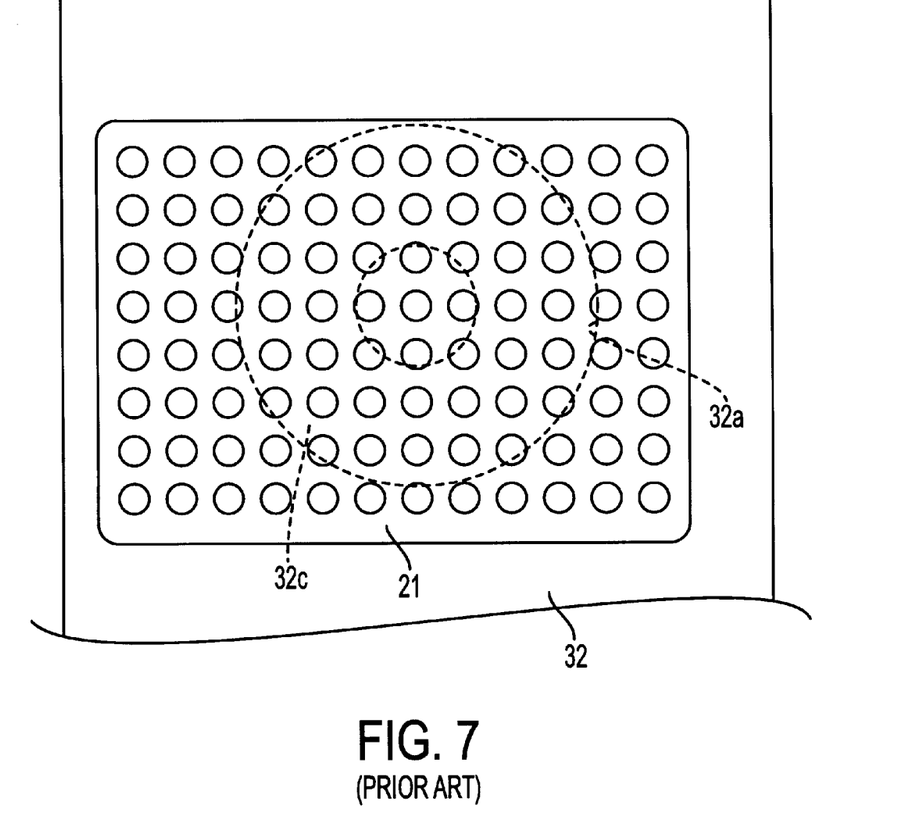
FIG. 7 is a top plan view of the stage when a ninety-six-hole plate is placed on the stage of a conventional inverted microscope.

As shown in FIG. 7 for this conventional inverted microscope 30, a sample container 21, such as a petri dish having an internal diameter of approximately between 35 mm and 100 mm, or a ninety-six-holes plate, are both widely used. However, when the sample container 21 is placed on the stage 32, the sample container 21 often blocks the field of view through annular disk 32c, and thus the conditions around the objective lens 34 cannot be confirmed by the observer from near the eye piece 35, diagonally above. As a result, an observer is forced to take an awkward position to confirm the conditions around the objective lens 34, and he/she cannot stay in the normal position for observation using the microscope 30.

One solution to this problem is to manufacture the stage 32 from glass materials. However, this solution causes other problems, such as an increased cost for machining since glass materials are heavier and more difficult to work with than when the stage 32 is manufactured from aluminum using die-casting or resin moulding. In addition, when the observer is performing a physiological experiment, the observer needs a tap in order to affix a micro-manipulator (not shown) on the stage 32. However, observers have found it difficult to bore the tap-hole on the stage 32 when it is made of glass. An alternative solution is to use a special tool, which is otherwise useless and wasted, to grasp the stage 32 without a tap in order to affix the micro-manipulator, thus increasing the operating cost of the inverted microscope 30. Therefore, while it is possible to manufacture the whole of stage 32 from a glass material, this causes both manufacturing and user problems as discussed above.

SUMMARY OF THE INVENTION

It is an object of the present invention to provide an inverted microscope which overcomes the above discussed problems of conventional inverted microscopes.

It is another object of the invention to provide an inverted microscope where the observer is able to view the objective lens from a normal viewing position diagonally above the objective lens when a sample container is placed on a stage of the microscope.

It is a further object of the invention to provide an inverted microscope having a stage that allows the objective lens to be viewed during observation of the sample from a normal viewpoint, is easier and cheaper to manufacture than comparable conventional stages, and can be altered by the user without the need for special tools.

It is a still further object of the invention to provide an inverted microscope having a nosepiece that is oriented to facilitate viewing of the objective lens from a normal viewing position.

Additional objects and advantages of the invention will be set forth in part in the description which follows and, in part, will be obvious from the description, or may be learned by practice of the invention.

In accordance with a preferred embodiment of the present invention, an inverted microscope comprises a stage to hold a sample, the stage having an observation opening and a confirmation opening that are separate from each other, an objective lens arranged under the stage, and an eyepiece provided diagonally above the stage. The observation opening secures a first optical path to observe the sample using the objective lens, and the confirmation opening secures a second optical path apart from the first optical path between a normal viewpoint near the eyepiece and the objective lens, wherein the confirmation opening is sized to allow confirmation of at least a half of an outer surface of the objective lens from the normal viewpoint, and the confirmation opening is fitted with a light-transmitting member made of glass or resin which is at least semi-transparent.

In accordance with further embodiments of the present invention, the confirmation opening of the inverted microscope allows confirmation of conditions around and on the objective lens disposed under the stage, including viewing a marking on the objective lens, from a normal viewpoint that is between 5 cm and 10 cm away from the eyepiece.

In accordance with further embodiments of the present invention, with this inverted microscope, the light-transmitting member is a standardized slide glass.

In accordance with another embodiment of the present invention, an inverted microscope comprises a stage to hold a sample, the stage having an observation opening and a confirmation opening that are separate from each other, an objective lens arranged under the stage, and an eyepiece provided diagonally above the stage. The observation opening secures an optical path to observe the sample using the objective lens, and the confirmation opening has mesh disposed within it that secures a sight line between a normal viewpoint near the eyepiece and the objective lens as to allow confirmation of conditions under the stage.

In accordance with another embodiment of the present invention, a method for using an inverted microscope includes placing a sample on an observation opening formed on a stage, illuminating the sample with an illumination light from over the sample, obtaining an image of the sample using an objective lens arranged under the sample through an eyepiece, and confirming a marking and other conditions on and around the objective lens from a normal viewpoint located in the vicinity of the eyepiece through a confirmation opening also formed on the stage.

In accordance with another embodiment of the present invention, the method for using the inverted microscope utilizes a normal viewpoint that is between 5 cm and 10 cm above, below, and to the side of the eyepiece.

In accordance with another embodiment of the present invention, the method for using the inverted microscope includes confirming the marking of the objective lens through a light-transmitting member fitted in the confirmation opening.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
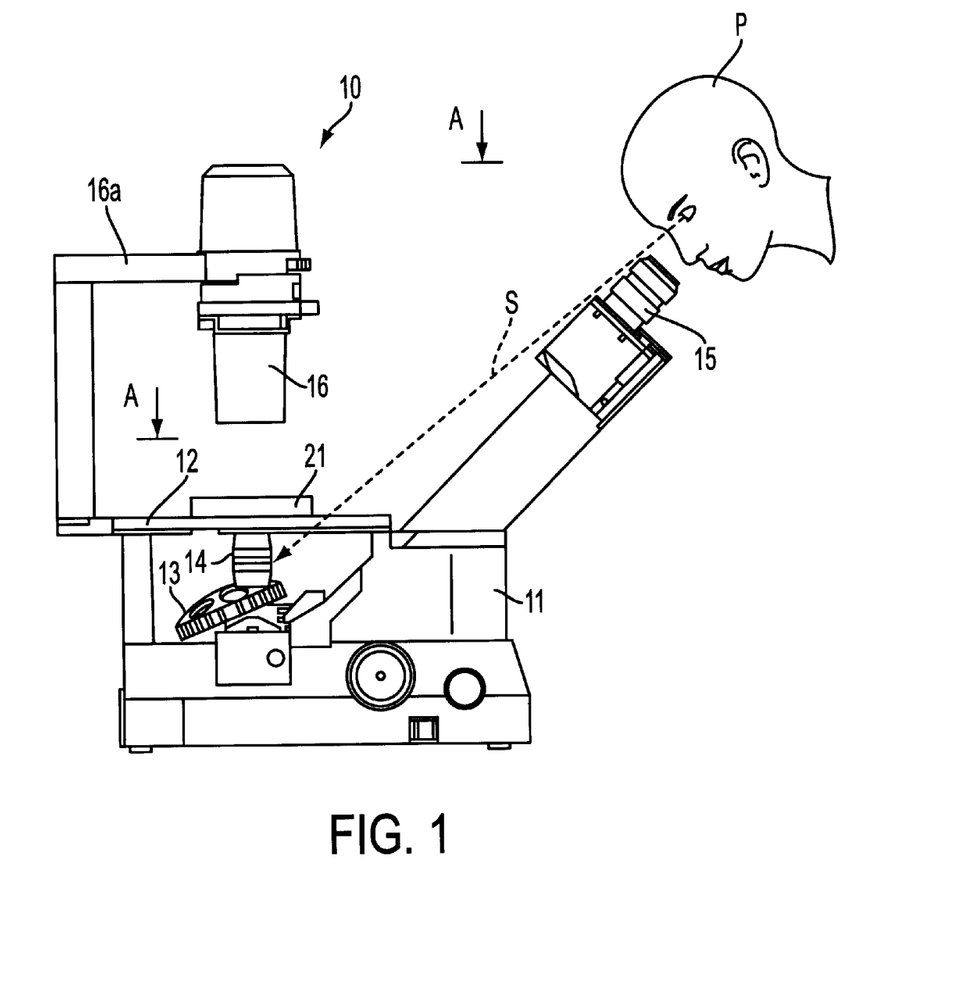
FIG. 1 is a side elevational view of an inverted microscope according to a preferred embodiment of the present invention.

FIG. 1 shows an embodiment of an inverted microscope 10 of the present invention. The inverted microscope 10 has a main body 11, to which a stage 12 is attached to receive a sample container 21. The stage is made of metal or resin material. Also attached to the main body 11 are a nosepiece 13, which is disposed under the stage 12, an objective lens 14 fitted on the nosepiece 13, an eyepiece 15 arranged diagonally above the stage 12 at a normal viewing area, and an illumination system 16 held over the stage 12 by an illumination column 16a.

Figure 3:
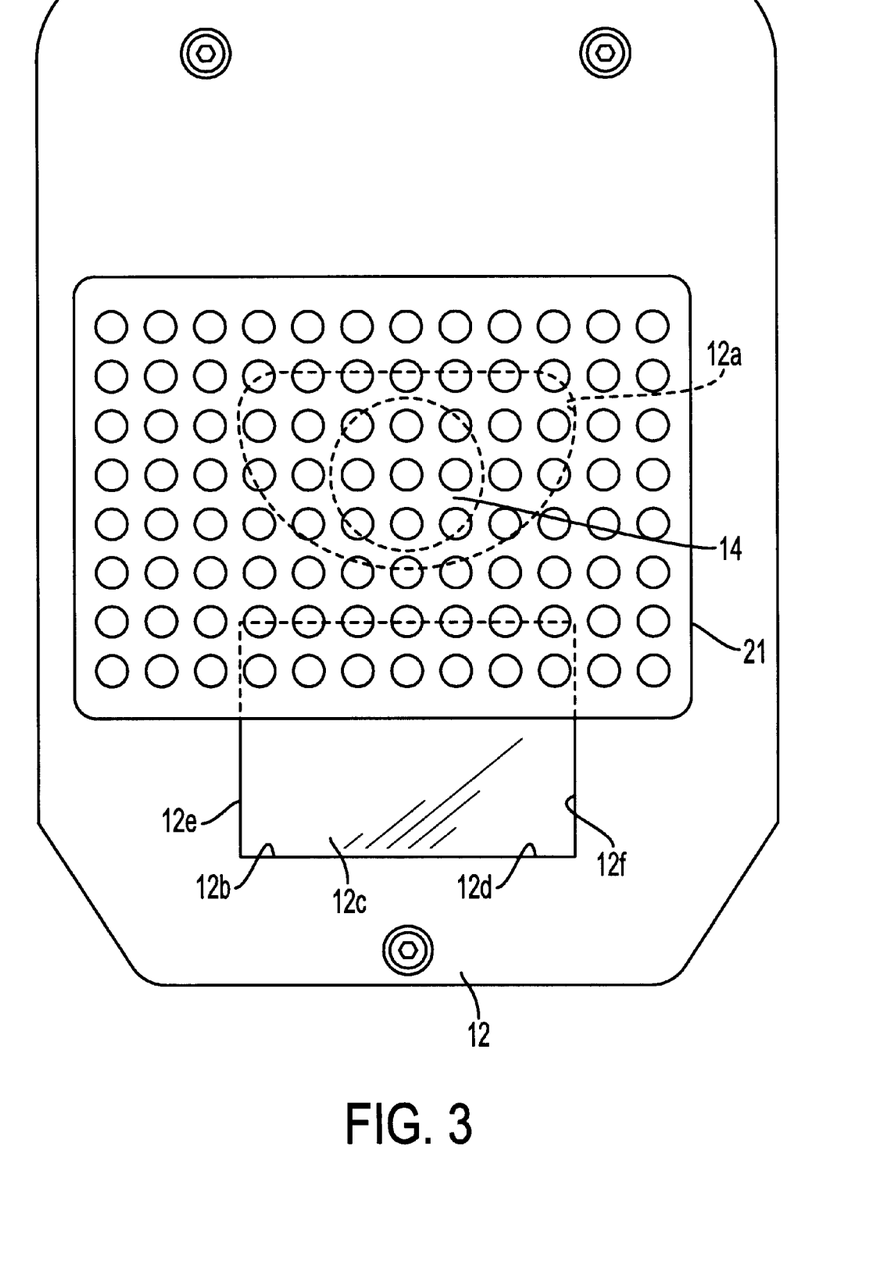
FIG. 3 is a top plan view of the stage where a ninety-six-hole plate is placed on the stage of the inverted microscope according to a preferred embodiment of the present invention.

When the inverted microscope 30 is used, the illumination system 16 illuminates a sample container 21, and the transmitted light passes through the underside of the sample container 21, and is received and observed by the eyepiece 15 through the objective lens 14. In general, a typical sample container 21 could be a ninety-six-hole plate as shown in FIG. 3, which is widely used for many kinds of inspections and experiments since it allows for each sample poured into each hole to be easily observed.

Figure 2:
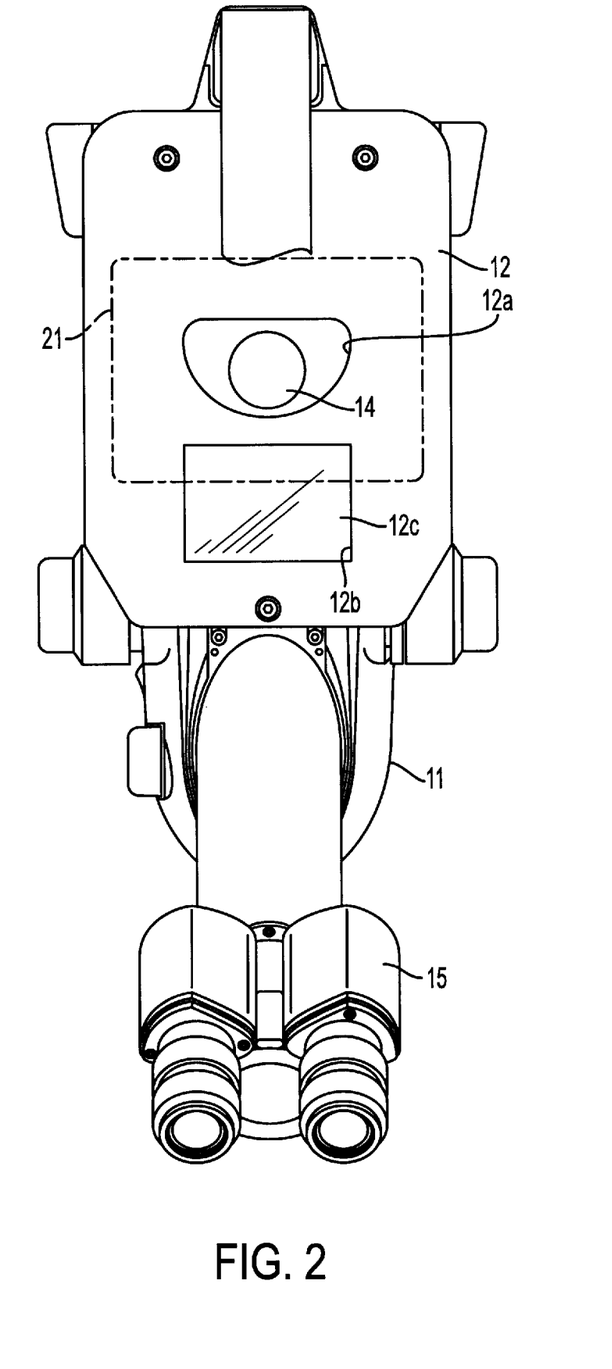
FIG. 2 is a top view of the inverted microscope shown in FIG. 1, taken from a position denoted by arrows A—A in FIG. 1.

As shown in FIG. 2, stage 12 has an observation opening 12a, which allows an observer P to view the sample container 21 shown in FIG. 1 using the objective lens 14. The observation opening 12a has a shape extended along the track of the objective lens 14, which allows the stage 12 to avoid interfering with the path of the tip of the objective lens 14, which is being turned on the nosepiece 13 during replacement of the objective lens 14. The shown observation opening 12a has a semicircular shape, with an arc portion pointing towards the observer. Of course, it is understood that the observation opening 12a is not limited to this shape, and could be any shape so long as the observation opening 12a avoids interfering with the objective lens 14 during replacement. Other shapes include, for example, a circular shape, or a zonal shape having a radius of curvature along the track of the objective lens 14 so as to not interfere with the objective lens 14 during rotation on the nosepiece 13.

The stage 12 also has a confirmation opening or window 12b, which is used to view around the objective lens 14 under the stage 12. The confirmation opening 12b is formed between the observation opening 12a and the observer P (not shown). Using this arrangement, when a sample container 21 is placed over the observation opening 12a as shown in FIGS. 1, 3, and 4, the observer P can view a marking 14a (FIG. 4) located on the objective lens 14, and can confirm the conditions for the use of the objective lens 14 from the normal viewpoint near the eyepiece 15 as shown by arrows denoting sight line S in FIGS. 1 and 4.

Being able to view marking 14a is important since marking 14a indicates the conditions and specifications (e.g., magnification, numerical aperture, bright field/phase contrast, etc.) for that objective lens 14. In addition, since the marking 14a is often displayed on opposing sides of the objective lens 14 (i.e., they are located 180° from each other), generally, at least half of the side of the objective lens 14 should be viewable through confirmation opening 12b in order to confirm the condition of objective lens 14.

Figure 4:
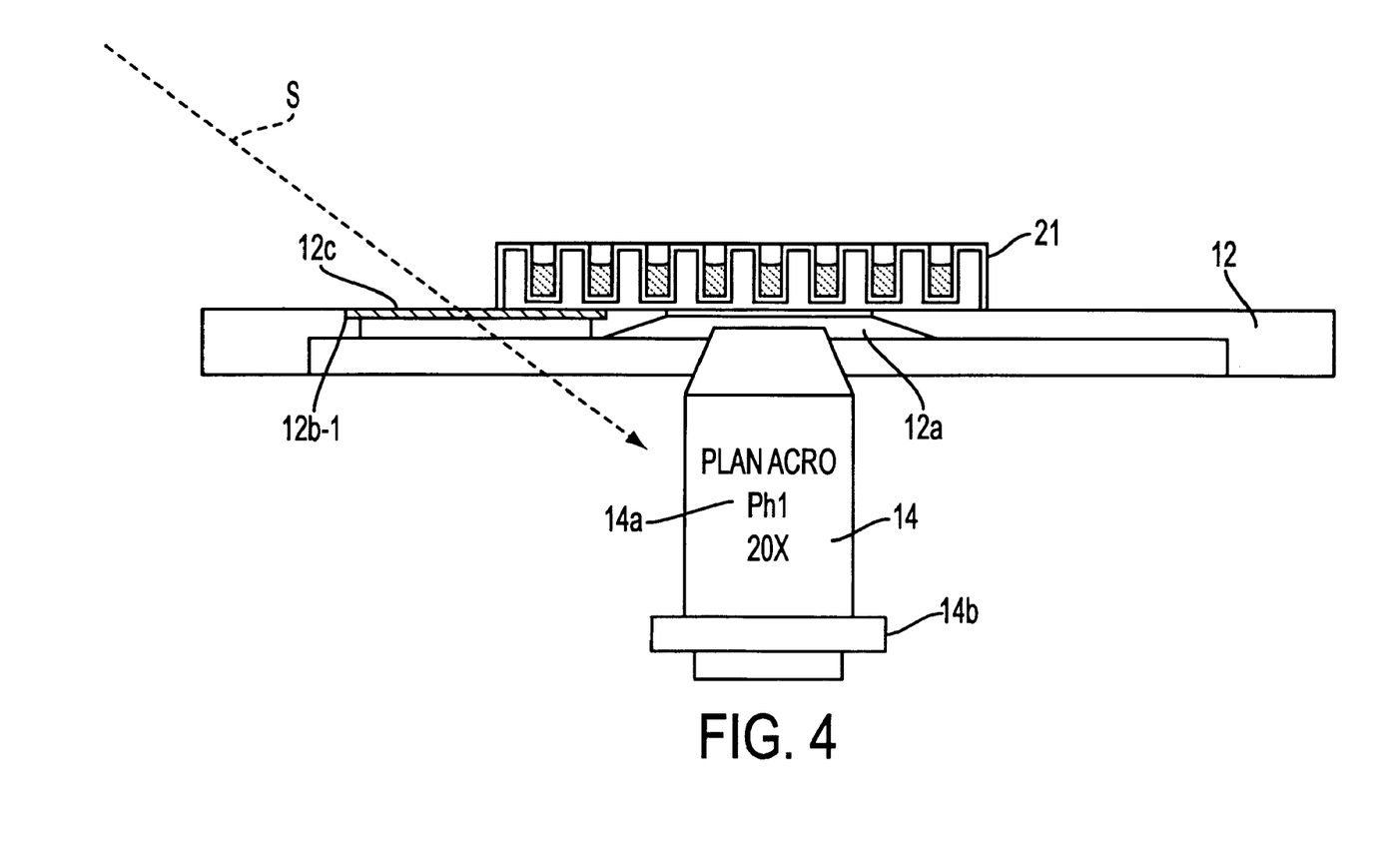
FIG. 4 is a sectional side view of FIG. 3 showing markings on the objective lens.

In addition, as shown in FIG. 4, a light-transmitting member 12c is flush mounted within the stage 12. In the shown embodiment, the stage 12 has a stepped portion 12b-1 formed on the periphery of the confirmation opening 12b, and the light-transmitting member 12c is fitted into the stepped portion 12b-1. By flush mounting the light-transmitting member 12c, the light-transmitting member 12c does not protrude from the upper surface of the stage 12 and interfere with the sample container 21. The shown light-transmitting member 12c is made from a slide glass used for observing specimens, which are readily available at a low price and are thus easy to replace when damaged.

It is understood that the light-transmitting member 12c is not required and need not always be used. However, the use of the light-transmitting member 12c is effective in preventing samples and sample containers 21 from dropping through the confirmation opening 12b.

In the shown embodiment, the size of the confirmation opening 12b is governed by a number of factors. First, the confirmation opening 12b is smaller than that of the sample container 21 in order to prevent the sample container 21 from dropping under the stage. Second, even where a light-transmitting member 12c is used to prevent sample container 21 from dropping through the stage 12, the size of the confirmation opening 12b is still reduced to maintain the structural integrity of the stage 12, with the size being further reduced should the stage 12 need to support heavier sample containers 21. Third, the confirmation opening 12b is positioned and sized so as to allow the observer P to confirm conditions on the marking 14a such that at least half of the objective lens 14 is viewable from between roughly 5 cm and 10 cm to the side of the eyepiece 15. Basically, if the observer P moves less than 5 cm, a blind spot may be produced, and if the observer P moves more than 10 cm, the observer P is forced into an awkward position by having to tilt, or crane his/her head excessively.

As shown in FIG. 3, these factors are met. The overall size is small enough to prevent a typical sample container 21, which is typically 85×128 mm, from being dropped through the confirmation opening 12b. This size also allows the stage 12 to maintain its structural integrity for the loaded sample container 21. In addition, in order to ensure that the observer P can view the marking 14a along sight line S shown in FIG. 1, near edge 12d of the confirmation opening 12b is at least 55 mm from the center of the objective lens 14, while side edges 12e and 12f make confirmation opening 12b wide enough to allow the observer P to move slightly to the right or left from the eyepiece 15 and still be able to read the marking 14a on at least half the objective lens 14.

While the shown confirmation opening 12b is rectangular, it is understood that it would be possible to use other shapes, such as circular, elliptical or diamond shapes so long as the above factors are met.

As shown in FIG. 1, the nosepiece 13 is tilted away from the observer P. Using this arrangement, the objective lens 14 under use is always closest to the observer P, which aids in allowing the observer P to view and confirm the marking 14a. The nosepiece 13 is rotatable so as to allow the replacement of the objective lens 14 with another objective lens 14. In order for the revolving operation of the nosepiece 13 to be performed smoothly, the observer P needs to be able to confirm the location of his/her hand relative to the objective lens 14 and the nosepiece 13. Using the shown embodiment, during replacement of the objective lens 14, the observer P can confirm where his/her hands are relative to the objective lens 14 from the normal viewing area in the vicinity of the eyepiece 15, and after replacement, the observer P can confirm the magnification or other information located on the marking 14a.

The objective lens shown in FIG. 4 is equipped with a correction member 14b for correcting aberrations. The correction member 14b corrects aberrations by turning a ring portion formed on the periphery of the lens barrel of the objective lens 14. The correcting operation is performed by turning the ring by hand, and is performed while observing the sample container 21. By being able to see the location of the correction member 14b from the normal viewpoint, the confirmation opening 12b also facilitates the correcting operation by allowing the observer P to confirm the position of the objective lens 14 from the normal viewpoint in order to grasp it by hand.

Although the present invention is preferably applied to an inverted microscope where an optical axis of the eyepiece 15 and the stage 12 are at an angle between 45° to 55° as shown in FIG. 1, the present invention is applicable to any inverted microscope having other angles.

The illumination system 16 for the embodiment shown in FIG. 1 is located over the sample. Where a light-transmitting member 12c is employed, it is possible that some of the light from the illumination system 16 would be reflected by the surface of the light-transmitting member 12c, causing a glare that makes it difficult to view the objective lens 14 through the light-transmitting member 12c. Thus, another embodiment of the present invention employs an anti-reflection film on the light-transmitting member 12c to prevent this glare. This film could be made from inorganic oxides, such as silicon dioxide, zirconium oxide, or the like, that are generally used for forming anti-reflection films on ordinary lens surfaces.

In yet another embodiment of the invention, it would be possible to combine the observation opening 12a and the confirmation opening 12b of the inverted microscope 10 into a single opening having observation and confirmation areas.

In another embodiment of the invention, if the observer P needs to make finer adjustments to the position of the sample container 21 than are possible by hand, the observer P can secure the sample container 21 in a x-y mechanical-stage fitted on the stage 12 of the inverted microscope 10 equipped with a micro-adjusting system.

In another embodiment of the invention, the light-transmitting member 12c of the inverted microscope 10 is both sealed and is adhered into stepped portion 12b-1. A conventional elastic seal gasket, such as one made from silicon rubber, could be used.

In yet another embodiment of the present invention, the inverted microscope 10 uses a plurality of smaller confirmation openings 12b, each disposed on the stage 12 to the left and right side relative to the center of the objective lens, and below the observation opening 12a.

Figure 8:
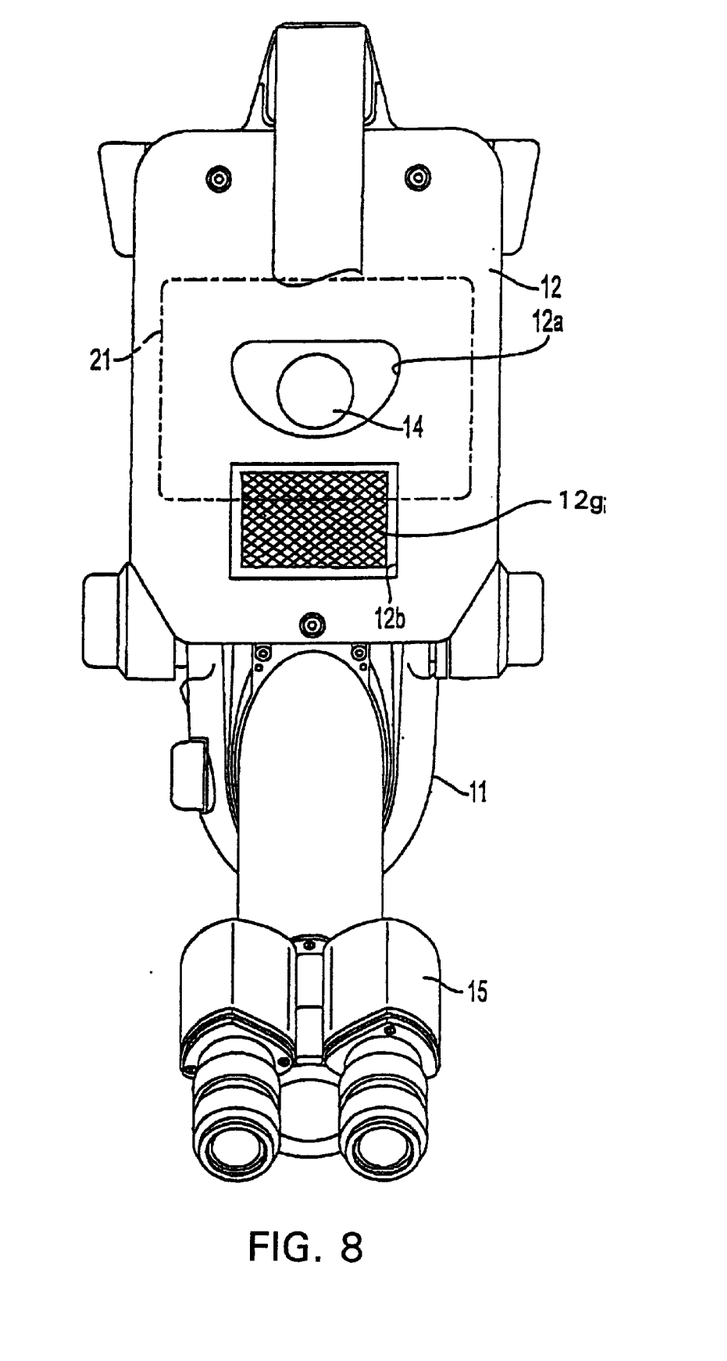
FIG. 8 is a top view of the inverted microscope shown in FIG. 1 showing a mesh in the confirmation opening according to another embodiment of the present invention, taken from a position denoted by arrows A—A in FIG. 1.

In a further embodiment of the invention, the inverted microscope 10 does not use a light-transmitting member 12c, but instead employs a mesh 12g either inserted into, or formed within, the confirmation opening 12b.

According to the preferred embodiments of the invention as described above, an observer can view and confirm markings on an objective lens, which is located under a stage, from a normal viewpoint located near an eyepiece located diagonally above the stage without changing a normal microscope-observing posture. Moreover, the preferred embodiments as described above do not have the defects of conventional inverted microscopes, where the observer's field of view under the stage is hindered by a sample container during observation. Lastly, the preferred embodiments of the invention as described above can be realized by an inverted microscope built at a lower cost than a conventional inverted microscope whose whole stage is made of glass.

Although a few preferred embodiments of the present invention have been shown and described, it would be appreciated by those skilled in the art that changes may be made to these embodiments without departing from the principles and spirit of the invention, the scope of which is defined in the claims and their equivalents.

What is claimed is:

1. An inverted microscope for analysing a sample, comprising:
    a stage to hold the sample, said stage comprising an observation opening and a confirmation opening;
    an objective lens arranged under said stage;
    an eyepiece arranged above said stage, in a vicinity of which is a normal viewpoint; and
    an illumination system arranged over said stage to illuminate the sample with an illumination light;
    wherein the observation opening is located along an optical path of the illumination light and allows an observation of the sample through said eyepiece using said objective lens; and wherein the confirmation opening, which is both near objective lens and located along a sight line between the normal viewpoint and said objective lens so as to allow viewing of said objective lens from the normal viewpoint.

2. The inverted microscope according to claim 1, wherein the observation opening and the confirmation opening are separate openings.

3. The inverted microscope according to claim 1, wherein the confirmation opening is formed so as to allow viewing of at least half of a surface of said objective lens from the normal viewpoint.

4. The inverted microscope according to claim 1, wherein the normal viewpoint extends to approximately between 5 cm and 10 cm to the side of said eyepiece.

5. The inverted microscope according to claim 1, wherein a near edge of the confirmation opening closest to the normal viewpoint is at least 55 mm from a center of said objective lens.

6. The inverted microscope according to claim 5, wherein the confirmation opening has a width, defined by edges perpendicular to the near edge, such that said objective lens can be viewed from the normal viewpoint that is approximately between 5 cm and 10 cm to the left and right of said eyepiece.

7. The inverted microscope according to claim 1, wherein the confirmation opening further comprises a light transmitting member, wherein the light-transmitting member is at least semi-transparent.

8. The inverted microscope according to claim 7, wherein the light-transmitting member is removable.

9. The inverted microscope according to claim 7, wherein the light-transmitting member further comprises an anti-reflection film disposed on a surface of the light-transmitting member.

10. The inverted microscope according to claim 7, wherein the light-transmitting member comprises a slide glass for microscopes.

11. The inverted microscope according to claim 1, wherein the confirmation opening further comprises a mesh shape member in the confirmation opening.

12. The inverted microscope according to claim 1, wherein said stage is made of metal or resin.

13. The inverted microscope according to claim 1, wherein said stage further comprises a horizontal plane, and said eyepiece further comprises an optical axis which is at an angle with the horizontal plane, wherein the angle is between 45° and 55°.

14. The inverted microscope according to claim 1, wherein said objective lens further comprises a correction ring to allow correction of aberrations produced while observing the sample.

15. A method for using an inverted microscope comprising:

placing a sample on an observation opening formed on a stage;

illuminating the sample with an illumination light from above the sample;

observing an image of the sample obtained by a objective lens arranged under the sample through an eyepiece; and confirming a marking or other conditions on and around the objective lens from a viewpoint located in a vicinity of the eyepiece through a confirmation opening formed on the stage.

16. The method for using an inverted microscope according to claim 15, wherein the vicinity of the eyepiece is a position that is between 5 cm and 10 cm above, below, or to the side of the eyepiece.

17. The method for using an inverted microscope according to claim 15, wherein the marking or other conditions on and around the objective lens is confirmed through a light-transmitting member fitted in the confirmation opening.

18. An inverted microscope for analysing a sample, comprising:

a stage to hold the sample;

an objective lens below said stage; and an eyepiece above said stage, in a vicinity of which is a normal viewpoint;

wherein said stage has at least one opening formed to allow both observation of the sample held on said stage through said eyepiece using said objective lens, and viewing of said objective lens from the normal viewpoint while the sample is held on said stage.

19. The inverted microscope of claim 18, further comprising a nosepiece, wherein said objective lens is attached to said nosepiece, said nosepiece orients said objective lens to allow viewing of said objective lens from the normal viewpoint, and said nosepiece and said at least one opening cooperate such that said objective lens does not contact said stage during removal.

20. The inverted microscope of claim 19, wherein said at least one opening comprises an observation opening and a confirmation opening, wherein the sample is observed through the observation opening, and said objective lens is viewed through the confirmation opening.

* * * * *